US010686809B2

(12) United States Patent
Boss et al.

(10) Patent No.: US 10,686,809 B2
(45) Date of Patent: *Jun. 16, 2020

(54) DATA PROTECTION IN A NETWORKED COMPUTING ENVIRONMENT

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Jeffrey R. Hoy, Gibsonia, PA (US); Agueda M. H. Magro, Zapopan (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,236

(22) Filed: May 6, 2019

(65) Prior Publication Data

US 2019/0260774 A1    Aug. 22, 2019

Related U.S. Application Data

(63) Continuation of application No. 15/842,131, filed on Dec. 14, 2017, now Pat. No. 10,326,785, which is a (Continued)

(51) Int. Cl.
*G06F 12/14* (2006.01)
*H04L 29/06* (2006.01)
(Continued)

(52) U.S. Cl.
CPC ........ *H04L 63/1416* (2013.01); *G06F 21/554* (2013.01); *G06F 21/577* (2013.01); *H04L 63/1433* (2013.01); *H04L 63/1491* (2013.01)

(58) Field of Classification Search
USPC .................. 726/23, 22, 24–25; 713/187–189
See application file for complete search history.

(56) References Cited

U.S. PATENT DOCUMENTS 6,453,345 B2 * 9/2002 Trcka ................... G06F 21/552
                                                        709/223
6,742,124 B1    5/2004 Kilpatrick et al.
(Continued)

FOREIGN PATENT DOCUMENTS

CN         101567887        5/2012

OTHER PUBLICATIONS

"List of IBM Patents or Patent Applications Treated as Related,", dated May 31, 2019, 1 page.
(Continued)

*Primary Examiner* — Amare F Tabor
(74) *Attorney, Agent, or Firm* — William H. Hartwell; Andrew W. Calderon; Roberts Calderon Safran & Cole, P.C.

(57) ABSTRACT

Approaches for providing data protection in a networked computing environment are provided. A method includes detecting, by at least one computer device, a breach of a first system in the networked computing environment. The method also includes generating, by the at least one computer device, a second system in the networked computing environment, wherein the second system includes a patch based on the breach. The method additionally includes converting, by the at least one computer device, the first system to a decoy system. The method further includes generating, by the at least one computer device, a third system in the networked computing environment, wherein the third system has reduced security relative to the first system.

20 Claims, 6 Drawing Sheets

Related U.S. Application Data continuation of application No. 14/699,218, filed on Apr. 29, 2015, now Pat. No. 9,923,908.

(51) Int. Cl.
*G06F 21/55* (2013.01)
*G06F 21/57* (2013.01)

(56) References Cited

U.S. PATENT DOCUMENTS

| | | |
|---|---|---|
| 7,034,476 B2 | 4/2006 | Wang et al. |
| 7,042,852 B2 | 5/2006 | Hrastar |
| 7,076,655 B2 | 7/2006 | Griffin et al. |
| 7,318,237 B2 | 1/2008 | Moriconi et al. |
| 7,367,055 B2 * | 4/2008 | Comer ............... H04L 63/1416 714/43 |
| 7,383,578 B2 | 6/2008 | Blake et al. |
| 7,437,766 B2 | 10/2008 | Cohen et al. |
| 7,475,427 B2 | 1/2009 | Palliyil et al. |
| 7,509,684 B2 * | 3/2009 | McDonald .......... G06F 21/6254 707/999.009 |
| 7,634,812 B2 | 12/2009 | Costa et al. |
| 7,636,944 B2 | 12/2009 | Raikar |
| 7,647,637 B2 | 1/2010 | Schuba et al. |
| 7,668,843 B2 | 2/2010 | Ertoz et al. |
| 7,694,339 B2 | 4/2010 | Blake et al. |
| 7,752,432 B2 | 7/2010 | Sheymov |
| 7,752,669 B2 | 7/2010 | Palliyil et al. |
| 7,890,612 B2 | 2/2011 | Todd et al. |
| 7,904,959 B2 | 3/2011 | Sidiroglou et al. |
| 7,934,258 B2 | 4/2011 | Wahl |
| 7,962,756 B2 | 6/2011 | Fagone et al. |
| 8,001,583 B2 | 8/2011 | Waizumi et al. |
| 8,015,606 B1 * | 9/2011 | Jevans .................... G06F 21/31 726/22 |
| 8,060,939 B2 | 11/2011 | Lynn et al. |
| 8,065,722 B2 | 11/2011 | Barford et al. |
| 8,122,505 B2 | 2/2012 | Verma et al. |
| 8,141,152 B1 | 3/2012 | Hwang et al. |
| 8,156,556 B2 | 4/2012 | Krishnamurthy |
| 8,161,540 B2 | 4/2012 | Mantripragada et al. |
| 8,181,250 B2 | 5/2012 | Rafalovich et al. |
| 8,209,760 B1 | 6/2012 | Hardman |
| 8,286,237 B2 | 10/2012 | Moghe |
| 8,413,241 B2 | 4/2013 | Weeks et al. |
| 8,443,446 B2 | 5/2013 | Lamastra et al. |
| 8,464,341 B2 | 6/2013 | Cohen |
| 8,479,288 B2 | 7/2013 | Martin et al. |
| 8,528,091 B2 | 9/2013 | Bowen et al. |
| 8,544,087 B1 | 9/2013 | Eskin et al. |
| 8,549,642 B2 | 10/2013 | Lee |
| 8,572,244 B2 | 10/2013 | Campagnoni |
| 8,578,497 B2 | 11/2013 | Antonakakis et al. |
| 8,584,219 B1 | 11/2013 | Toole et al. |
| 8,769,687 B2 | 7/2014 | Hoefelmeyer et al. |
| 8,789,189 B2 | 7/2014 | Capalik et al. |
| 8,819,825 B2 | 8/2014 | Keromytis et al. |
| 8,902,066 B2 | 12/2014 | Parker et al. |
| 8,943,594 B1 | 1/2015 | Arrowood |
| 8,955,143 B1 | 2/2015 | Ramalingam et al. |
| 8,973,142 B2 | 3/2015 | Shulman et al. |
| 9,009,719 B2 | 4/2015 | Ramteke et al. |
| 9,032,531 B1 * | 5/2015 | Scorvo .................... G06F 21/55 726/25 |
| 9,077,665 B1 | 7/2015 | Loughmiller |
| 9,094,444 B2 | 7/2015 | Baltatu et al. |
| 9,106,687 B1 | 8/2015 | Sawhney et al. |
| 9,106,697 B2 | 8/2015 | Capalik et al. |
| 9,118,709 B2 | 8/2015 | Oliphant et al. |
| 9,356,942 B1 | 5/2016 | Joffe |
| 9,356,950 B2 | 5/2016 | Vissamsetty et al. |
| 9,367,809 B2 | 6/2016 | Puri et al. |
| 9,386,041 B2 | 7/2016 | Carver et al. |
| 9,401,927 B2 | 7/2016 | Shulman et al. |
| 9,462,013 B1 | 10/2016 | Boss et al. |
| 9,462,521 B2 | 10/2016 | Wang et al. |
| 9,503,463 B2 | 11/2016 | Karta et al. |
| 9,609,019 B2 | 3/2017 | Vissamsetty et al. |
| 9,769,204 B2 | 9/2017 | Vissamsetty et al. |
| 9,838,416 B1 | 12/2017 | Aziz |
| 9,875,347 B2 | 1/2018 | Baghdasaryan |
| 9,894,086 B2 | 2/2018 | Boss et al. |
| 9,923,908 B2 | 3/2018 | Boss et al. |
| 9,954,870 B2 | 4/2018 | Boss et al. |
| 10,171,485 B2 | 1/2019 | Boss et al. |
| 2003/0105973 A1 * | 6/2003 | Liang ..................... G06F 21/56 726/24 |
| 2003/0135762 A1 | 7/2003 | Macaulay |
| 2004/0078592 A1 | 4/2004 | Fagone et al. |
| 2004/0111636 A1 | 6/2004 | Baffes et al. |
| 2005/0166072 A1 | 7/2005 | Converse et al. |
| 2006/0101516 A1 | 5/2006 | Sudaharan et al. |
| 2006/0161786 A1 | 7/2006 | Rao |
| 2008/0082833 A1 * | 4/2008 | Lewis ................... G06F 21/572 713/189 |
| 2008/0222715 A1 | 9/2008 | Bansal et al. |
| 2008/0271151 A1 | 10/2008 | Blake et al. |
| 2009/0328213 A1 | 12/2009 | Blake et al. |
| 2010/0017870 A1 * | 1/2010 | Kargupta ............ H04L 63/1408 726/14 |
| 2010/0024017 A1 | 1/2010 | Ashfield et al. |
| 2010/0122078 A1 | 5/2010 | Sheymov |
| 2010/0146615 A1 | 6/2010 | Locasto et al. |
| 2010/0269175 A1 | 10/2010 | Stolfo et al. |
| 2011/0167494 A1 | 7/2011 | Bowen et al. |
| 2011/0179487 A1 | 7/2011 | Lee |
| 2011/0276597 A1 | 11/2011 | Little |
| 2011/0321165 A1 | 12/2011 | Capalik et al. |
| 2011/0321166 A1 | 12/2011 | Capalik et al. |
| 2012/0072990 A1 | 3/2012 | Gutt et al. |
| 2012/0151585 A1 | 6/2012 | Lamastra et al. |
| 2013/0097704 A1 | 4/2013 | Gavrilut et al. |
| 2013/0111540 A1 | 5/2013 | Sabin |
| 2013/0185763 A1 | 7/2013 | Yasuda |
| 2013/0318607 A1 | 11/2013 | Reed et al. |
| 2013/0333037 A1 | 12/2013 | Bowen et al. |
| 2013/0347111 A1 * | 12/2013 | Karta .................. H04L 63/1441 726/23 |
| 2014/0007239 A1 | 1/2014 | Sharpe et al. |
| 2014/0007264 A1 | 1/2014 | Berger |
| 2014/0280887 A1 | 9/2014 | Kjendal et al. |
| 2014/0280889 A1 | 9/2014 | Nispel et al. |
| 2014/0359708 A1 | 12/2014 | Schwartz |
| 2014/0359777 A1 | 12/2014 | Lam et al. |
| 2015/0013006 A1 | 1/2015 | Shulman et al. |
| 2015/0040220 A1 | 2/2015 | Mantripragada et al. |
| 2015/0047032 A1 | 2/2015 | Hannis et al. |
| 2015/0324616 A1 | 11/2015 | Alarabi |
| 2015/0326599 A1 | 11/2015 | Vissamsetty et al. |
| 2016/0072837 A1 | 3/2016 | Arrowood |
| 2016/0219069 A1 | 7/2016 | Mittig et al. |
| 2016/0323300 A1 | 11/2016 | Boss et al. |
| 2016/0323301 A1 | 11/2016 | Boss et al. |
| 2016/0373470 A1 | 12/2016 | Boss et al. |
| 2018/0083989 A1 | 3/2018 | Boss et al. |
| 2018/0103048 A1 | 4/2018 | Boss et al. |
| 2018/0109547 A1 | 4/2018 | Boss et al. |
| 2018/0109548 A1 | 4/2018 | Boss et al. |
| 2019/0098031 A1 | 3/2019 | Boss et al. |
| 2019/0132358 A1 | 5/2019 | DiValentin et al. |

OTHER PUBLICATIONS

Specification "Managing Security Breaches in a Networked Computing Environment" and Drawings in related U.S. Appl. No. 16/416,624, filed May 20, 2019, 42 pages.

Notice of Allowance in related U.S. Appl. No. 16/204,354 dated May 23, 2019, 9 pages.

Notice of Allowance in related U.S. Appl. No. 15/842,952 dated May 1, 2019, 7 pages.

List of IBM Patents or Patent Applications Treated as Related, dated Jul. 29, 2019, 1 page.

(56) References Cited

OTHER PUBLICATIONS

Specification "Data Protection in a Networked Computing Environment" and Drawings in related U.S. Appl. No. 16/509,844, filed Jul. 12, 2019, 43 pages.
Locasto et al., "FLIPS: Hybrid Adaptive Intrusion Prevention", Recent Advances in Intrusion Detection, 2005, abstract only, 3 pages.
Cho et al., "Hybrid Network Defense Model Based on Fuzzy Evaluation", The Scientific World Journal, vol. 2014, Article ID: 178937, 13 pages.
Wikipedia, "Honeypot (computing)", http://en.wikipedia.org/wiki/Honeypot_(computing), Apr. 3, 2015, 6 pages.
Vollmer et al., "Cyber-Physical System Security With Deceptive Virtual Hosts for Industrial Control Networks", IEEE Transactions on Industrial Informatics, vol. 10, No. 2, 2014, pp. 1337-1347.
Blowers et al., "Machine Learning Applied to Cyber Operations", Advances in Information Security, vol. 55, 2014, pp. 155-175.
Mell et al., "The NIST Definition of Cloud Computing", NIST, Special Publication 800-145, Sep. 2011, 7 pages.
Shimoda et al., "Sensor in the Dark: Building Untraceable Large-Scale Honeypots Using Virtualization Technologies", IEEE/IPSJ, 2010, 9 pages.
Kaur et al., G., "Intrusion Detection System Using Honeypots and Swarm Intelligence", ACAi, 2011, 5 pages.
"List of IBM Patents or Patent Applications Treated as Related," 2 pages.
Notice of Allowance issued in U.S. Appl. No. 16/416,624 dated Jan. 16, 2020, 5 pages.
Notice of Allowance in related U.S. Appl. No. 16/204,354 dated Sep. 3, 2019, 5 pages.
Office Action in related U.S. Appl. No. 16/416,624 dated Sep. 6, 2019, 14 pages.
Office Action dated Feb. 21, 2020 in related U.S. Appl. No. 16/509,844, 16 pages.

\* cited by examiner

DATA PROTECTION IN A NETWORKED COMPUTING ENVIRONMENT

FIELD OF THE INVENTION

The present invention generally relates to data security, and more particularly, to data protection in a networked computing environment.

BACKGROUND

Cloud computing has become popular as organizations are discovering that it provides a cost-effective, scalable, and flexible option to deliver business or consume IT (Information Technology) services over a network environment such as the Internet. Cloud computing presents unique issues in terms of data security. A honeypot is a data security tool used to lure attackers and analyze attacker activity in computing environments. Use of honeypots in cloud environments is generally limited to generation of additional environments, some of which are honeypots with falsified data.

The concept of a honeypot for data security was introduced as an information system resource that helps to detect unauthorized use such as malicious attacks. There are two main types of honeypots: a production honeypot to protect an organization, and a research honeypot to predict, monitor, and learn. Honeypots can be automatically provisioned in cloud environments, and provisioned based on attacker activity. However, these solutions have considerable drawbacks of affecting either valid users or attacker system usage, which limits the value of the honeypot. As a result, traditional automated honeypot generation in a cloud environment suffers from several major limitations. For example, in systems that create honeypots up front (e.g., multiple application environments where one environment is the true environment), legitimate users still need to be routed to the valid environment. Therefore, sophisticated attackers can identify the valid environment with relative ease, and the value of the decoy (honeypot) environments is limited mainly to non-targeted attackers that would stumble onto such an environment. Systems that create honeypots in response to an attack suffer from the same problem in the other direction: if a valid system is being migrated away from an exposed system, valid users need to be migrated to the new, valid system. An attacker can simply monitor the valid user flow to recognize that a compromised environment has been converted into a honeypot.

SUMMARY

In a first aspect of the invention, there is a method of providing data protection in a networked computing environment. The method includes detecting, by at least one computer device, a breach of a first system in the networked computing environment. The method also includes generating, by the at least one computer device, a second system in the networked computing environment, wherein the second system includes a patch based on the breach. The method additionally includes converting, by the at least one computer device, the first system to a decoy system. The method further includes generating, by the at least one computer device, a third system in the networked computing environment, wherein the third system has reduced security relative to the first system.

In another aspect of the invention there is a system for providing data protection in a networked computing environment. The system includes at least one computer device in the networked computing environment, wherein the at least one computer device is configured to: detect a breach of a first production system in the networked computing environment; generate a second production system in the networked computing environment, wherein the second production system includes a patch based on the breach; convert the first production system to a decoy system; generate a third system in the networked computing environment, wherein the third system includes predetermined vulnerabilities that are patched in the first production system; and monitor the third system for a new breach.

In another aspect of the invention there is a system for providing data protection. The system includes a networked computing environment including: a first system comprising a first database and a first server that serves an application; a second system comprising a second database and a second server that serves the application; and a third system comprising a third database and a third server that serves the application. The second database includes valid data. The first database includes a modified version of the valid data. The second system includes a patch based on a vulnerability detected in the first system. The third system includes the vulnerability detected in the first system and additional predetermined vulnerabilities that are patched in the first system.

In another aspect of the invention, there is a computer program product for providing data protection. The computer program product includes a computer readable storage medium having program instructions embodied therewith. The program instructions are executable by a computer device to cause the computer device to: detect a breach of a first production system in the networked computing environment; generate a second production system in the networked computing environment, wherein the second production system includes a patch that eliminates a vulnerability exposed by the breach; convert the first production system to a decoy system by: removing high value data from a database in the first production system; generating decoy high value data based on low value data contained in the database; and storing the decoy high value data in the database; generate a third system in the networked computing environment, wherein the third system includes: the vulnerability exposed by the breach and predetermined vulnerabilities that are patched in the first production system; and monitor the third system for a new breach that exposes a vulnerability other than the vulnerability exposed by the breach and the predetermined vulnerabilities that are patched in the first production system.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
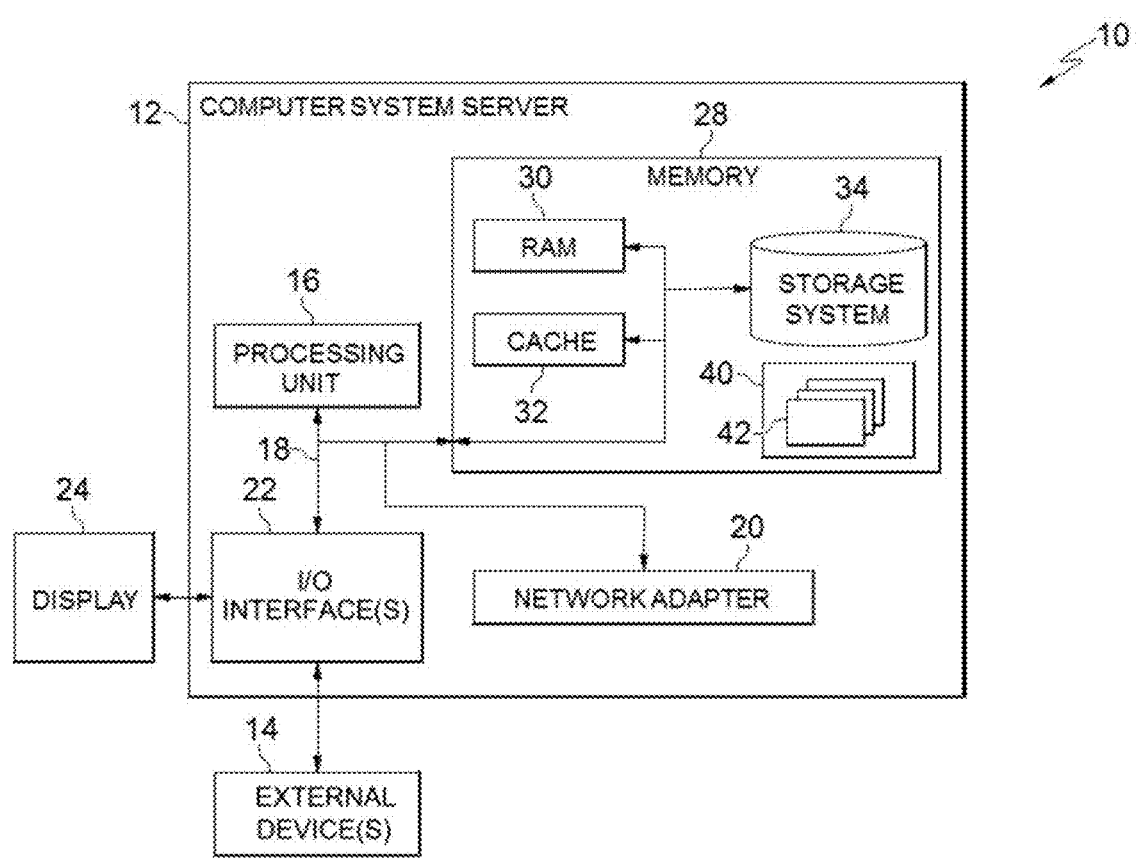
FIG. 1 depicts a cloud computing node according to an embodiment of the present invention.

The present invention generally relates to data security, and more particularly, to data protection in a networked computing environment. In accordance with aspects of the invention, prescribed actions are taken upon discovering a breach of a production system (e.g., an attack by a hacker). These actions may include: generating a new production system that includes a patch or other configuration update to mitigate the breach; converting the breached original production system to a honeypot (decoy) system with replicated low value data; and generating a reduced security (weak) honeypot system that includes additional known vulnerabilities. The use of low value data in the breached original production system diverts the attacker's attention away from activities that may lead to a breach of the patched production system. The reduced security honeypot system with additional known vulnerabilities is used to lure an attacker and then monitor the attacker's actions to discover new (i.e., unknown) vulnerabilities that can then be patched in the patched production system. In this manner, implementations of the invention leave an existing exposed infrastructure intact and analyze attacker techniques to prevent future attacks.

Aspects of the invention described herein are directed to systems and methods that enhance techniques of automated honeypot generation. Some solutions react to a breach by creating a new cloud infrastructure in a clean environment, or by transforming an existing system into a honeypot. However, these solutions do not substantially alter the source environment and generated honeypots for additional intelligence gathering. Implementations of the invention may include creating honeypots with automatically reduced security compared to the source environment. Implementations of the invention may also include the replication of low value data into a honeypot database to entice attackers.

As described herein, in addition to patching newly generated, non-compromised systems with fixes that would prevent an attacker from duplicating a previously successful attack, aspects of the invention provide the attacker a chance to duplicate their success in a honeypot environment. Security tools and forensic analysis may be used to detect a security breach of a production system, including determining the entry point of an attacker and the method(s) used in the breach. In embodiments, based on detecting the breach, the system creates a new honeypot environment alongside a new clean environment in order to distract and lure the attacker while the production system is patched or migrated.

According to aspects of the invention, the newly created honeypot may be further reduced in security compared to the original breached system. This provides a benefit of the attacker likely spreading attacks within the newly created honeypot system, wasting time and resources and further revealing data about the attacker. The attacker may also focus additional attack resources on the perceived weaker system (i.e., the newly created honeypot system), for example launching zero-day attacks against the reduced security environment that may not have been used against a sufficiently hardened system. A zero-day (or zero-hour or day zero) attack or threat is an attack that exploits a previously unknown vulnerability in a computer application or operating system, one that developers have not had time to address and patch. Implementations of the invention provide for luring the attacker into launching a zero-day attack, observing and analyzing the new attack, and proactively developing and applying a patch to the production system based to eliminate a vulnerability exposed by the newly detected attack. These aspects may be used in a stand-alone honeypot that is physically and logically separated from the production system. These aspects may also be used in hybrid honeypots that are physically and/or logically interweaved with the production system, where the honeypot side of the infrastructure has intentionally reduced security, or dynamically reduced security based on the user activity, to lure the attacker into attacking the areas of least resistance.

As described herein, in addition to generating a reduced security honeypot, aspects of the invention generate a honeypot database that is populated based on valid low value data or a scrambled version of valid data from the breached original production system (as opposed to falsified or fake data). Identification of low value data can be based on existing security compliance classifications, such as classification of company confidential and non-confidential data. When generating a honeypot, the confidential data can be filtered from the source system (e.g., by leveraging a data redaction solution), and the generated honeypot then contains valid low value data. The data validity may create difficulties for an attacker, and cause the attacker to waste resources analyzing the low value data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
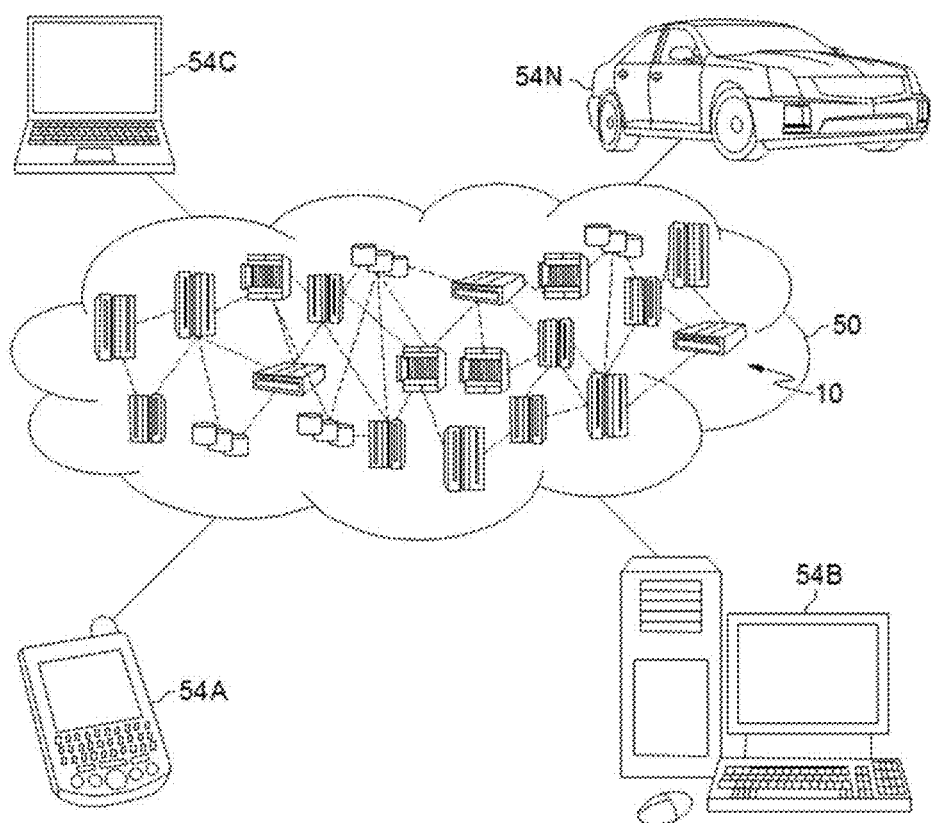
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
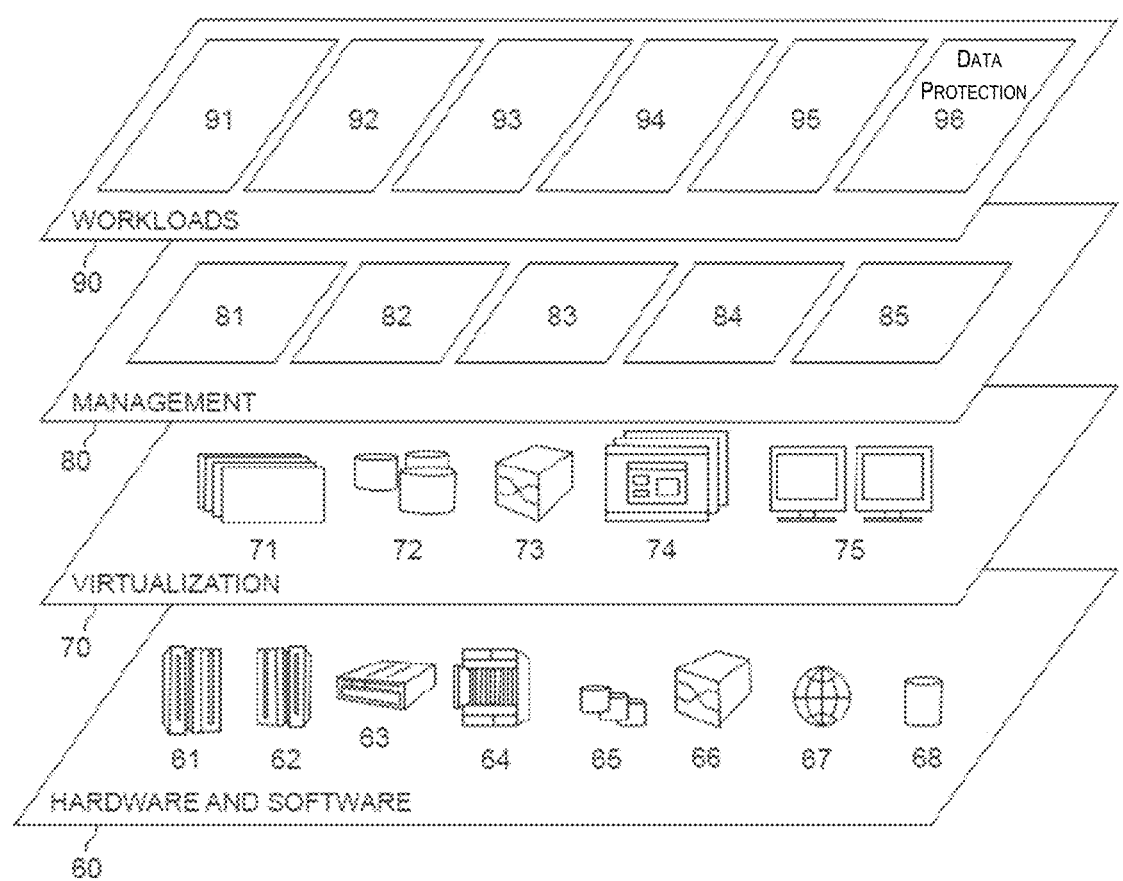
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data protection 96. As described herein, data protection 96 may include: detecting a breach (e.g., unauthorized access, denial of service attack, or other malicious activity) at a production system; generating a new production system that includes a patch based on the detected breach; converting the breached original production system to a honeypot (decoy) system with replicated low value data; and generating a reduced security honeypot system that includes additional known vulnerabilities.

Figure 4:
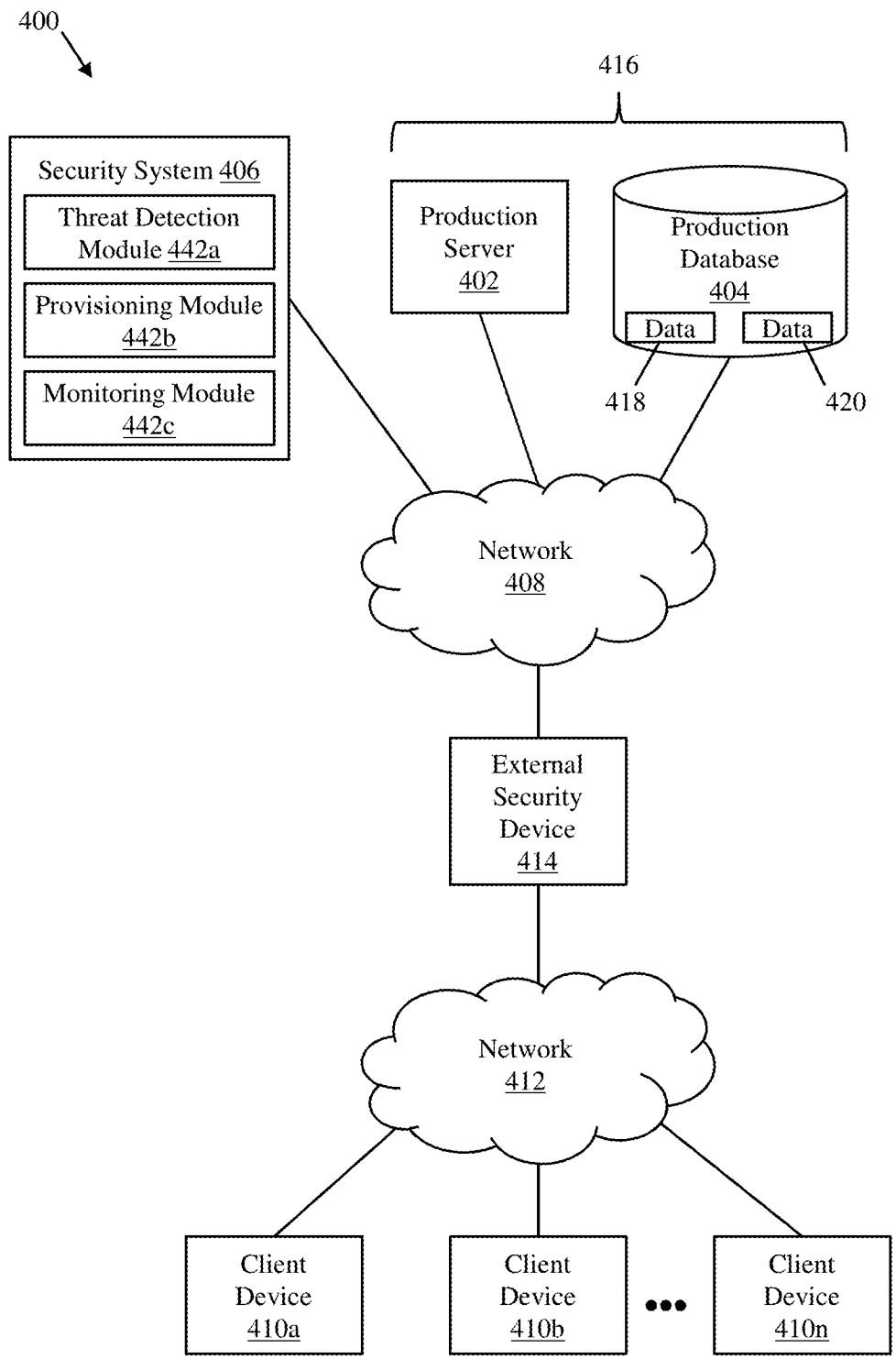
FIGS. 4 and 5 depict an illustrative environment and functionality in accordance with aspects of the invention.

FIG. 4 depicts an illustrative environment for implementing the steps in accordance with aspects of the invention. Specifically, FIG. 4 shows a networked computing environment 400 including a production server 402, a production database 404, and a security system 406 all connected to a network 408. Each of the production server 402, the production database 404, and the security system 406 may include a respective computer system/server 12 as described with respect to FIG. 1. Further, the environment 400 may be a cloud computing environment in which each of the production server 402, the production database 404, and the security system 406 are located at one or more computing nodes of the cloud computing environment, e.g., in a manner as described with respect to FIG. 2. The environment 400 may be a private cloud environment used by an enterprise, e.g., to conduct business functions. The elements 402, 404, 406 may be at respective different nodes of the environment 400. Alternatively, two or more of the elements 402, 404, 406 may be at a same node of the environment 400.

As depicted in FIG. 4, client devices 410a, 410b, . . . , 410n may be operatively connected to the network 408 via a second network 412 such as the Internet. The client devices 410a-n may be conventional user computer devices, such as computing devices 54A-N shown in FIG. 2. An external security device 414, such as a firewall and routing device, may be interposed between the network 408 and the second network 412. In this manner, valid users may be provided access to the production server 402 and/or production database 404 by providing authentication credentials to the security device 414 via one of the client devices 410a-n.

In one exemplary implementation, the production server 402 and the production database 404 are part of a production system 416 that is owned or operated by an enterprise. The production server 402 may include an application server such as a web server, for example, and the production database 404 may include data associated with customers of the enterprise. An individual customer of the enterprise may use a client device 410a-n to access the production server 402 via an Internet address, at which point the customer may utilize an application served by the production server 402 that accesses, changes, or otherwise uses data contained in the production database 404. As is understood in the art, an application server may include a computing device that hosts an application program and serves the application program to a networked client computing device. As is further understood in the art, a database may include a collection of data that is stored on a computing device and that is accessed through an application server. Aspects of the invention are not limited to this exemplary implementation, and other implementations may be used within the scope of the invention.

In embodiments, the production database 404 stores low value data 418 and high value data 420. The respective types of data that are included in the low value data 418 and high value data 420 may be defined, for example, by the enterprise associated with the system 416. For example, low value data 418 may be data that is relatively less sensitive to a breach by an unauthorized user of the system 416, and high value data 420 may be data that is relatively more sensitive to a breach by an unauthorized user of the system 416. In a cloud-based system the system data may be tagged with its respective sensitivity, which can be later used by the honeypot generation system.

Still referring to FIG. 4, according to aspects of the invention, the security system 406 includes a threat detection module 442a, a provisioning module 442b, and a monitoring module 442c that correspond to program modules 42 as described with respect to FIG. 1. In embodiments, the threat detection module 442a is configured to detect a breach of the system 416 by a client device (e.g., client device 410a-n). The threat detection module 442a may use security and/or forensic software to collect and/or analyze data associated with actions of client device 410a-n that are directed at the system 416, such as a client device 410a-n accessing, probing, or scanning the system 416. For example, the threat detection module 442a may use security information and event management (SIEM) software to detect a breach of the system 416.

As described herein, a breach may include unauthorized access of an element of the system 416, an attack on the system 416 such as a denial of service attack, or other malicious activity that targets the system 416. The data collected by the threat detection module 442a may be used in an automated or semi-automated manner to flag certain behavior as a breach and to determine a vulnerability of the system 416 that permitted the breach. For example, a human user, such as an IT security analyst, may use the data obtained by the threat detection module 442a to perform a forensic analysis of actions taken at the system 416 for the purpose of identifying a breach and the vulnerability that permitted the breach. In another example, the threat detection module 442a may automatically detect and indicate a breach based on the collected data satisfying one or more predefined conditions that define a breach. Implementations of the invention are not limited to these techniques for detecting a breach, and any suitable techniques (conventional or later developed) may be utilized by the threat detection module 442a.

Figure 5:
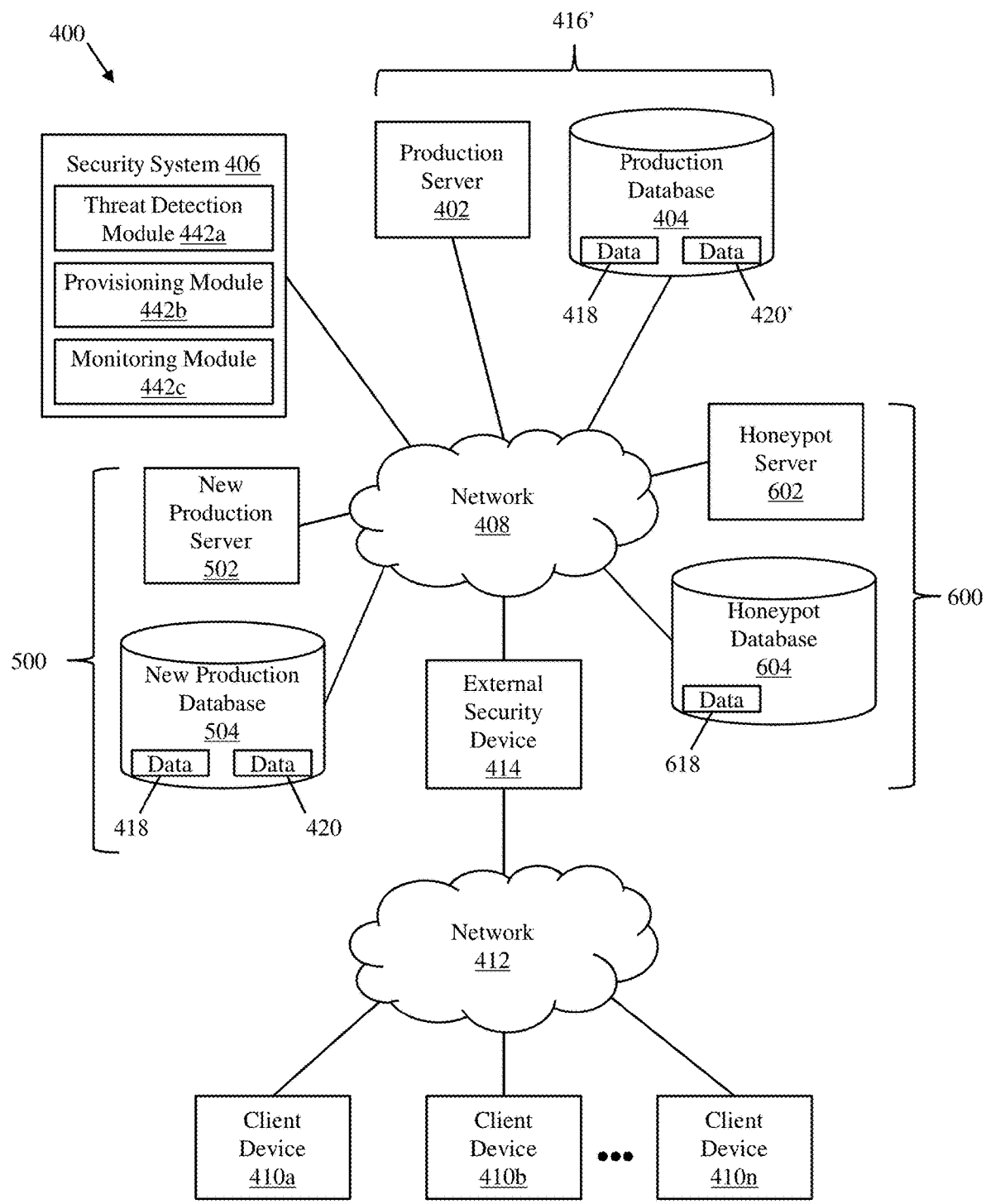

Referring now to FIGS. 4 and 5, according to aspects of the invention, the provisioning module 442b is configured to cause the performance of responsive actions in the environment 400 based on a breach of the system 416 being detected using the threat detection module 442a. In embodiments, the actions include: generating a new production system 500 that includes a patch for the detected breach; converting the breached original production system 416 to a honeypot (decoy) system 416' with replicated low value data selected based on the data classification; and generating a reduced security honeypot system 600 that includes known vulnerabilities.

As shown in FIG. 5, in embodiments, generating a new production system 500 includes provisioning a new production server 502 and a new production database 504 in the environment 400. Each of the new production server 502 and new production database 504 may include a computer system/server in the environment 400, and may be configured to perform the same business function(s) as the production server 402 and production database 404. For example, the new production server 502 may be configured to serve the same application(s) as production server 402, and the new production database 504 may be provided with the same data as the production database 404, including the low value data 418 and the high value data 420. The provisioning of the new production system 500 may be performed in an automated or semi-automated manner using conventional techniques. For example, in a semi-automated implementation, one or more scripts of the provisioning module 442b may prompt a user to provide input relating to user-selected features of the new production system 500, and the provisioning module 442b may then automatically generate the new production system 500 based on the input provided by the user. In an automated implementation, the provisioning module 442b may generate exact copies of the production server and the production database within the environment 400 without any input from a user.

Additionally, the new production system 500 includes a patch or other configuration change installed on at least one of the new production server 502 and the new production database 504. As is understood in the art, a patch is a piece of software designed to update a computer program or supporting data to fix a security vulnerability. As but one example, when a vulnerability is detected and determined as being due to a backlevel system library, a patch may involve apply manual or automatic (e.g., using an endpoint solution) patching on the affected machines. In implementations of the invention, the patch is created to fix (e.g., eliminate) the security vulnerability that permitted the breach of the system 416. The patch may be created in a conventional manner, e.g., by a user such as a software developer and/or IT security analyst. The patch is included in the new production server 502 and/or the new production database 504 when the new production system 500 is generated. Upon generating the new production system 500, the valid users that access the environment 400 are routed to the new production system 500 instead of the breached production system 416.

With continued reference to FIG. 5, the breached original production system 416 is converted to a honeypot (decoy) system 416'. In embodiments, the production server 402 and the production database 404 are left intact in the environment 400, and the data in the production database 404 is modified by removing sensitive data. For example, the high value data 420 may be deleted from the production database 404 and the low value data 418 may be left in the production database 404. In embodiments, the high value data 420 is replaced in the production database 404 with decoy high value data 420' that is generated based on the low value data 418. For example, for an encrypted file where the system has the capability to decrypt file contents, the data contents can be replaced with a low value file and the data re-encrypted so that the data appears superficially identical to the source data. Likewise low value data can be scrambled, carved up and otherwise transformed to give the appearance of more sensitive or protected data. In this manner, the breached original production system 416 is converted to a honeypot system 416' with the goal of keeping the attacker occupied in a honeypot and, thus, diverting the attacker's resources away from the new production system 500.

Still referring to FIG. 5, in accordance with aspects of the invention, a reduced security (i.e., weak) honeypot system 600 is generated in the environment 400. In embodiments, generating the reduced security honeypot system 600 includes provisioning a new honeypot server 602 and a new honeypot database 604 in the environment 400. Each of the honeypot server 602 and honeypot database 604 may include a computer system/server in the environment 400, and may be configured to perform the same business function(s) as the production server 402 and production database 404. For example, the honeypot server 602 may be configured to serve the same application(s) as production server 402.

In embodiments, the honeypot database 604 contains data 618 that may include one or more of: the low value data 418; a modified (e.g., scrambled) version of the low value data 418; the decoy high value data 420'; and data that is not based on the data from the production database 404 (i.e., data from another source). In a preferred embodiment, the honeypot database 604 does not contain the high value data 420 since the honeypot database 604 has intentionally reduced security.

According to aspects of the invention, the reduced security honeypot system 600 illustrated in FIG. 5 is generated to include the vulnerability that led to the detected breach of system 416. As such, the reduced security honeypot system 600 does not include the patch that is applied to the new production system 500. An attacker that probes the environment 400 for the same vulnerability that led to the breach of the system 416 may detect the vulnerability in the reduced security honeypot system 600 and subsequently expend resources attacking the reduced security honeypot system 600. In this manner, implementations of the invention lure an attacker into attacking the reduced security honeypot system 600.

According to aspects of the invention, the reduced security honeypot system 600 illustrated in FIG. 5 is also generated with additional predetermined security vulnerabilities. For example, the software programs (e.g., operating systems, applications, etc.) installed on the honeypot server 602 and/or the honeypot database 604 may be old versions of the programs that have known vulnerabilities to known attacks (e.g., Shellshock, Heartbleed, etc.). An attacker that probes the environment 400 for the known vulnerabilities may detect such a vulnerability in the reduced security honeypot system 600 and subsequently expend resources attacking the reduced security honeypot system 600. Additionally, other attackers that happen upon honeypot system 600 will find other known vulnerabilities can be used to attack the system. In this manner, implementations of the invention lure attackers into attacking the reduced security honeypot system 600.

The reduced security honeypot system 600 may be automatically generated with the additional predetermined security vulnerabilities. In one example, the reduced security honeypot system 600 is deployed using a historical snapshot of the system 416. Since system libraries and applications get patched over time, an older version of the system 416 will contain known exploits. For example, if an administrator patched OpenSSL in May 2014, a system snapshot from October 2013 would contain the Heartbleed vulnerability. Archived snapshots can be further combined with system maintenance and application defect records to identify specific differences between the old and new systems, which provides a specific list of known vulnerabilities being injected into the reduced security honeypot system 600 by using a historical snapshot.

In another example, the reduced security honeypot system 600 is deployed using a current snapshot of the system, but then rolling back specific libraries with known exploits. For example, the OpenSSL library can be rolled back or lowered to a prior (e.g., older) version known to be vulnerable to Heartbleed, and the bash library can be rolled back or lowered to a prior (e.g., older) version known to be vulnerable to Shellshock. Patched vulnerability information for open source libraries is available publicly and can provide a list of vulnerabilities being injected. Alternatively the system may be configured to maintain a list of widely exploited libraries and bugs (as in the case of custom application) for use as a reference to know which vulnerabilities are being injected into the system.

Using either method (i.e., a historical snapshot or a current snapshot with a rollback), the system may be configured to additionally catalog the injected vulnerabilities and reference them against the exploits known to be used against the weak honeypots. These exploits can then be categorized as "not interesting" by security devices or manual analysis. For example, customers running STEM software in the reduced security honeypot system 600 may configure the SIEM software to have a "low" severity for the Heartbleed and Shellshock attack activity, or the system may be configured to automatically configure the SIEM software to ignore the injected exploits.

Using either method (i.e., a historical snapshot or a current snapshot with a rollback), the number of vulnerabilities to inject may be a configurable option. An administrator may provide this detail, or the system may make an estimate based on the number of vulnerabilities that should be injected and the severity of known exploits.

Still referring to FIG. 5, in accordance with aspects of the invention, the monitoring module 442c monitors an attacker's actions in the reduced security honeypot system 600 to detect evidence of a new breach based on a previously unknown vulnerability of the production system. For example, the monitoring module 442c may employ SIEM software to detect and collect data on a zero-day attack by an attacker in the reduced security honeypot system 600. A user, such as an IT security specialist, a developer, etc., may analyze the data associated with the zero-day attack on the reduced security honeypot system 600 and develop a patch for the new production system 500 that hardens the new production system 500 against the detected zero-day attack. In this manner, implementations of the invention provide a mechanism for identifying which attacks an attacker will try to use. For attacks that have not yet been targeted at the new production system 500, the attacks can be monitored and analyzed such that vulnerabilities can be proactively mitigated on the new production system 500.

Figure 6:
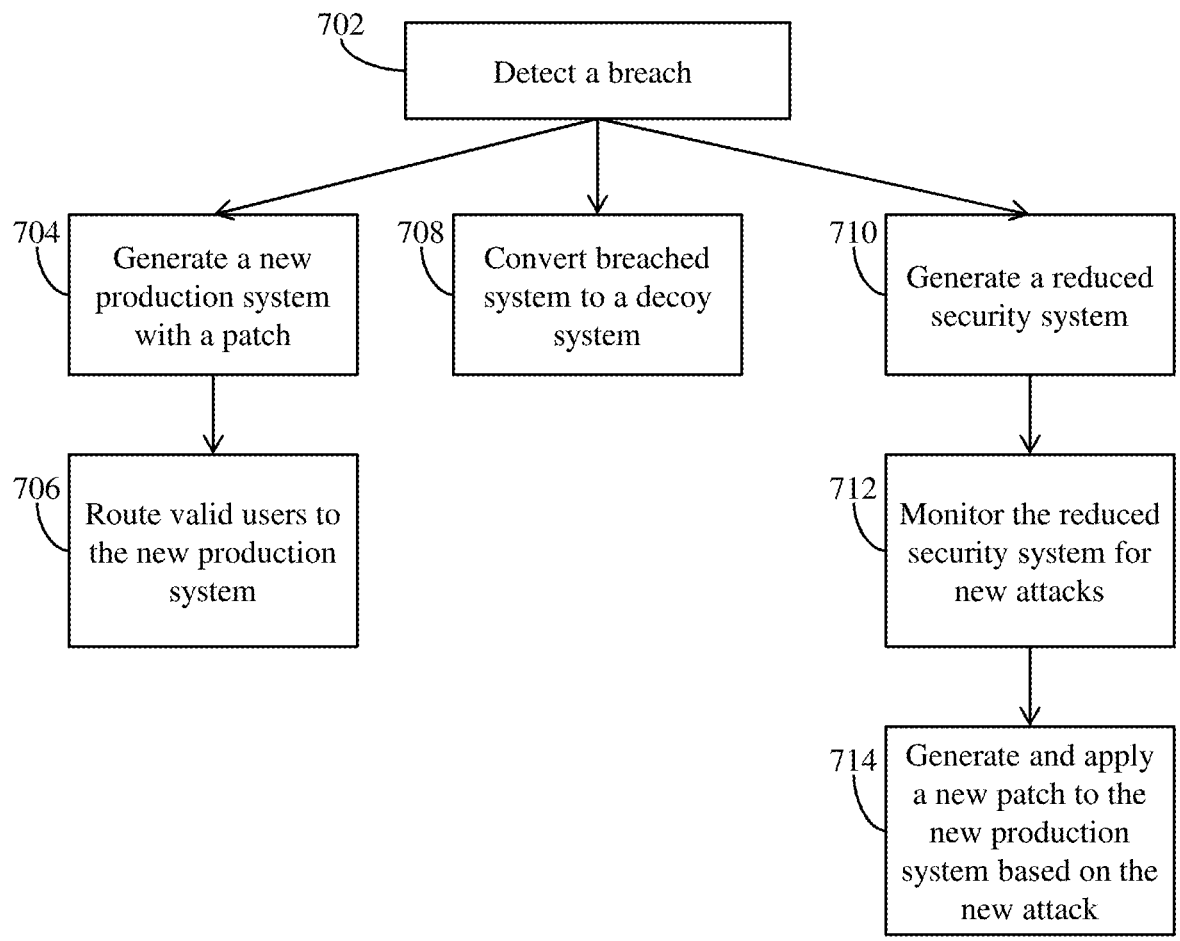
FIG. 6 depicts a flow diagram of an exemplary process in accordance with aspects of the invention.

FIG. 6 shows an exemplary flow for performing aspects of the present invention. The steps of FIG. 6 may be implemented in the environments of FIGS. 1-5, for example. As noted above, the flowchart(s) illustrate the architecture, functionality, and operation of possible implementations of systems, methods, and computer program products according to various embodiments of the present invention.

FIG. 6 depicts an exemplary flow for a process in accordance with aspects of the present invention. At step 702, a breach is detected in a networked computing environment. In embodiments, the networked computing environment includes a production system such as system 416 including a production server 402 and a production database 404 described with respect to FIG. 4. The breach may be, for example, an unauthorized access, attack, or other malicious activity at one of the elements of the production system. The breach may be detected using a computer system (such as security system 406 executing a threat detection module 442a) that communicates with one or more elements of the networked computing environment. At step 704, a new production system is generated based on the detecting the breach. In embodiments, a computer system (such as security system 406 executing a provisioning module 442b) generates the new production system in the manner described with respect to new production system 500 of FIG. 5. For example, the new production system may include a new production server and a new production database provisioned in the networked computing environment. The new production server and database may be substantially the same as the original production server and database prior to the breach, with the exceptions that the new production server and database are physically and/or logically separate from the original production server and database, and at least one of the new production server and database is patched to eliminate the vulnerability that permitted the breach that was detected at step 702.

At step 706, valid users of the production system are routed to the new production system instead of the breached original production system. For example, as described in FIG. 5, an external security and routing device may receive a request and authentication credentials from a client computing device (e.g., client device 410a), and route the user to the new production system.

At step 708, the breached original production system is converted to a decoy system. In embodiments, a computer system (such as the security system 406 executing the provisioning module 442b) converts the breached original production system to a decoy system in the manner described with respect to honeypot system 416' of FIG. 5. For example, the production database of the breached original production system is modified by removing sensitive data. The production database of the breached original production system may be further modified by adding new data, such as decoy high value data.

At step 710, a reduced security system is generated in the networked computing environment. In embodiments, a computer system (such as the security system 406 executing the provisioning module 442b) generates the reduced security system in the manner described with respect to reduced security honeypot system 600 of FIG. 5. In embodiments, the reduced security system is provisioned in a manner to include the vulnerability that permitted the breach of step 702. In additional embodiments, the reduced security system is provisioned in a manner to include additional known vulnerabilities.

At step 712, the reduced security system is monitored to detect new attacks. When a new attack is detected at step 712, then at step 714 a patch is generated and applied to the new production system. Steps 712 and 714 may be accomplished in the manner described with respect to FIG. 5. For example, a computer system (such as the security system 406 executing the monitoring module 442c) monitors the reduced security system for new attacks. Based on data collected by the computer system, a new attack (e.g., a zero-day attack) may be detected and analyzed, and a patch that eliminates a vulnerability exposed by the new attack may be developed and applied to the new production system. In this manner, monitoring a decoy system can be used to develop a patch for a production system.

In still another embodiment, the invention provides a computer-implemented method for data protection on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing data protection in a networked computing environment, comprising:
    detecting, by at least one computer device, a breach of a first system in the networked computing environment;
    in response to the detecting of the breach of the first system, generating, by the at least one computer device, a second system in the networked computing environment, wherein the second system includes a database which includes a scrambled version of low value data and a patch which is a configuration update applied to the database of the second system that eliminates a vulnerability exposed by the breach; and
    converting, by the at least one computer device, the first system to a decoy system.

2. The method of claim 1, wherein the generating the second system comprises:
    determining a vulnerability that permitted the breach;
    creating the patch to eliminate the vulnerability;
    provisioning a new production server and a new production database in the networked computing environment; and
    applying the patch to at least one of the new production server and the new production database.

3. The method of claim 1, further comprising:
    routing a client request for a service to the first system prior to the generating the second system; and
    routing a client request for the service to the second system after the generating the second system.

4. The method of claim 1, wherein:
    the first system and the second system are physically separate; and
    the first system in the networked computer environment comprises a first server and a first database and the second system in the networked computer environment comprises a second server and a second database.

5. The method of claim 1, wherein the converting the first system to the decoy system comprises generating and adding decoy high value data to the database of the first system.

6. The method of claim 1, wherein a service provider at least one of creates, maintains, deploys and supports the at least one computer device.

7. The method of claim 1, wherein the detecting the breach, the generating the second system, and the converting the first system are provided by a service provider on a subscription, advertising, and/or fee basis.

8. The method of claim 1, wherein the detecting the breach, the generating the second system, and the converting the first system are provided by software as a service in a cloud environment.

9. The method of claim 1, wherein the configuration update mitigates the breach.

10. A computer program product for providing data protection in a networked computing environment, the computer program product comprising a computer readable storage device having program instructions embodied therewith, the program instructions being executable by a computer device to cause the computer device to:
   detect a breach of a first production system in the networked computing environment;
   in response to the detecting the breach of the first production system, generate a second production system in the networked computing environment, wherein the second production system includes a database which includes a scrambled version of low value data and a patch which is a configuration update applied to the database of the second system that eliminates a vulnerability exposed by the breach; and
   convert the first production system to a decoy system, wherein the scrambled version of the low value data is encrypted.

11. The computer program product of claim 10, wherein the generating the second production system comprises:
   determining a vulnerability that permitted the breach;
   creating the patch to eliminate the vulnerability;
   provisioning a new production server and a new production database in the networked computing environment; and
   applying the patch to at least one of the new production server and the new production database.

12. The computer program product of claim 10, the program instructions further being executable by the computer device to cause the computer device to:
   route a client request for a service to the first production system prior to the generating the second production system; and
   route a client request for the service to the second production system after the generating the second production system.

13. The computer program product of claim 10, wherein:
   the first production system and the second production system are physically separate; and
   the first production system in the networked computer environment comprises a first server and a first database and the second production system in the networked computer environment comprises a second server and a second database.

14. The computer program product of claim 10, wherein the converting the first production system to the decoy system comprises generating decoy high value data based on low value data contained in a database in the first production system; and storing the decoy high value data in the database.

15. The computer program product of claim 10, wherein a service provider at least one of creates, maintains, deploys and supports the at least one computer device.

16. The computer program product of claim 10, wherein the detecting the breach, the generating the second production system, and the converting the first production system are provided by a service provider on a subscription, advertising, and/or fee basis.

17. The computer program product of claim 10, wherein the detecting the breach, the generating the second production system, and the converting the first production system are provided by software as a service in a cloud environment.

18. The method of claim 1, wherein the low value data comprises non-confidential data.

19. The method of claim 18, wherein the converting the first system to the decoy system comprises deleting high value data from the decoy system.

20. The method of claim 19, wherein the high value data comprises confidential data and a decoy high value data is generated based on the low value data contained in a first database in the first system.

* * * * *